June 3, 1930.  W. J. HEALEY  1,760,947
GRAPHIC INSTRUMENT
Filed Feb. 28, 1929

INVENTOR
William J. Healey.
BY
ATTORNEY

Patented June 3, 1930

1,760,947

UNITED STATES PATENT OFFICE

WILLIAM J. HEALEY, OF BLOOMFIELD, NEW JERSEY, ASSIGNOR TO WESTINGHOUSE ELECTRIC AND MANUFACTURING COMPANY, A CORPORATION OF PENNSYLVANIA

GRAPHIC INSTRUMENT

Application filed February 28, 1929. Serial No. 343,395.

My invention relates to electrical measuring instruments and, more particularly, to graphic meters utilizing circular-disc charts.

My invention has for an object the provision of means for decreasing the switchboard space required for graphic meters of the circular-disc type.

The usual graphic meter of this type is made in the shape of a drum and requires switchboard area sufficient to accommodate at least the diameter of the base thereof. In some types of graphic instruments, although the chart is only about 2½ inches wide, a space of about 8½ inches in diameter is required for the mounting thereof on the switchboard. Such space is exceptionally large in comparison with the width of the chart.

In accordance with my invention, I provide a narrow instrument, preferably rectangular in shape, having the circular chart so arranged that the driving plane of the chart is at right angles to the surface of the portion that is to be marked by the recording stylus.

Figure 1:
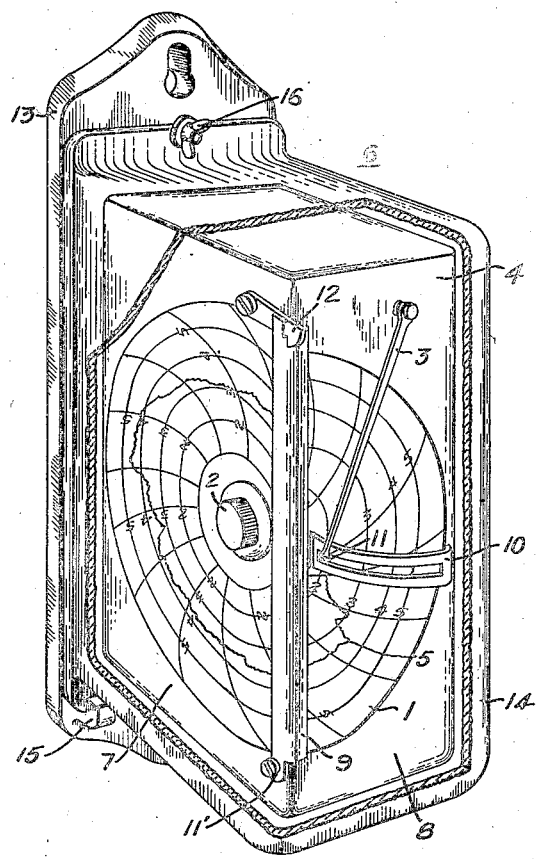
Figure 2:
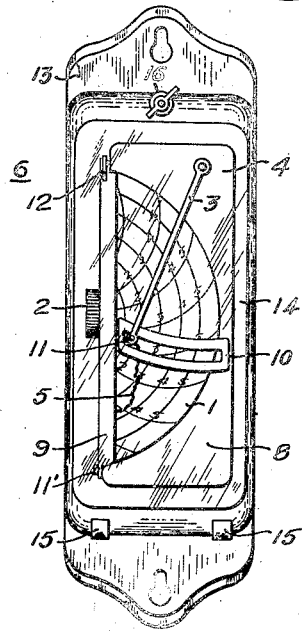

My invention may be more readily understood by reference to the accompanying drawings taken in connection with the following description:

Figure 1 is a perspective view of a graphic meter constructed in accordance with my invention; and Fig. 2 is a view, in front elevation, of the graphic meter shown in Fig. 1.

A graphic meter 6 constructed in accordance with my invention comprises a circular chart 1 having means, such as a clock element 2, for turning the same at a constant speed, and a stylus 3 driven by a measuring instrument 4 coacting with said circular chart to make a record 5 thereon, of the movement of the stylus. The graphic meter 6 is like the ordinary circular-chart graphic meter with the exception that the circular chart 1 is provided with means for causing it to pass over two angularly-related planes, so that the width of the instrument may be made very much smaller than the diameter of the chart heretofore mentioned.

The paper chart 1 is caused to move over a plane surface 7 parallel to the plane of the movement of the main body of the circular chart 1 and also over a plane surface 8, substantially at right angles to the first-mentioned plane surface and parallel to the plane of movement of the stylus 3. A guide 9 is provided for keeping the paper in its proper path of travel, and a slotted member 10 is provided for flattening out the paper chart 1 in the vicinity of the path of travel of the coacting point 11 of the stylus 3. The guide 9 is preferably hinged at 11′ so that, by lifting a latch 12, the guide may be dropped to permit removal of the paper chart 1.

The operating mechanism including the clock 2 and the measuring instrument 4, is preferably mounted on a base 13 which may be a panel switchboard upon which many other instruments are mounted. A glass cover 14 is provided for the meter and the same may be held in place by any suitable means as, for example, brackets 15 and wing nut 16. By simply removing the wing nut 16, the glass cover 14 may be readily removed from its position.

As illustrated in the drawings, the portion of the chart 1 visible from the front of the meter is at right angles to the major portion thereof, but the curve 5 drawn on the chart 1 by the stylus 3 may be easily observed at any time.

An instrument constructed in accordance with my invention materially reduces the amount of space necessary on the switchboard for graphic instruments of the circular-chart type. When it is considered that, in the majority of all power houses, there are a large number of circular-chart graphic instruments of various types, such as steam gauges, pressure gauges, water gauges and the like, and that each requires a considerable space on the switchboard, the space economy made possible by my invention is readily appreciated.

One of the principal advantages of circular-chart graphic meters is the convenience with which the circular charts may be filed. Since it is seldom necessary to view the complete record of the chart while the same is on the instrument, as this is usually done when the charts are removed and recorded prior to filing, the partial obscurement of the chart while on the instrument is not a disadvantage.

With the structure described, it is possible to see about three-fifths of the entire area of the circular chart at all times. This fact permits an operator to analyze the record made during several hours prior to the time of the observation.

The operators of a great many power houses are interested in the use of three-phase ammeters or three graphic instruments mounted together in one casing. By the utilization of my invention, it is possible to mount one chart or element immediately above the other and to have the charts overlapping each other, thus permitting three instruments to be put in a space much smaller, both in width and length, than has heretofore been possible.

My invention is applicable to all types of circular-chart graphic meters, it being the primary purpose of my invention to produce such an instrument having a comparatively small width without sacrificing any of the advantages of this type of instrument. Although I have shown and claimed my instrument as involving a circular chart, movable in angularly-related planes, it will be apparent to those skilled in the art that angularly-related circular or conically-shaped surfaces may be also utilized to advantage without departing from the spirit of my invention.

I claim as my invention:

1. In a measuring instrument, the combination with a rotatable chart and a stylus coacting therewith, of means for rotating said chart in a plurality of planes.

2. In a measuring instrument, a rotatable chart having means associated therewith for confining it to a plurality of angularly-related planes, means for rotating said chart, and means for making a record on said chart.

3. The combination with a rotatable chart and means for rotating said chart, of a stylus movable in a plane at an angle to the movement of the main body of said chart, and means for moving a portion of said chart in a plane parallel to the plane of movement of said stylus, said stylus being adapted to coact with said portion of said chart.

4. In a measuring instrument, the combination with a rotatable chart and means for rotating said chart, of means for causing a portion of said chart to move in a plane at an angle to that of the main body of said chart, and a stylus for coaction with said chart.

5. In a meter, a disc of flexible material, means for rotating said disc, means for causing a portion of said disc to pass through a plane angularly related to the plane of movement of the central portion thereof, and indicating means coacting with that portion of said disc passing through said angularly-related plane.

6. In a recording meter, a paper disc, means for rotating said disc, means for guiding said disc through a plurality of planes, and a stylus adapted to coact with said disc.

In testimony whereof, I have hereunto subscribed my name this twentieth day of February 1929.

WILLIAM J. HEALEY.